(12) United States Patent
Williams

(10) Patent No.: US 6,256,695 B1
(45) Date of Patent: Jul. 3, 2001

(54) DISK DRIVE METHOD OF DETERMINING SCSI BUS STATE INFORMATION AFTER A SCSI BUS RESET CONDITION

(75) Inventor: Jeffrey L. Williams, Rochester, MN (US)

(73) Assignee: Western Digital Corporation, Lake Forest, CA (US)

( * ) Notice: Subject to any disclaimer, the term of this patent is extended or adjusted under 35 U.S.C. 154(b) by 0 days.

(21) Appl. No.: 09/268,620

(22) Filed: Mar. 15, 1999

(51) Int. Cl.[7] ....................................................... G06F 13/00
(52) U.S. Cl. .................. 710/107; 714/42; 714/43
(58) Field of Search ..................................... 710/100, 107, 710/129; 714/2, 5, 36, 42, 43, 44

(56) References Cited

U.S. PATENT DOCUMENTS 5,033,049 * 7/1991 Keener et al. ........................ 714/33
5,594,922 * 1/1997 Suzuki et al. ........................ 710/107

* cited by examiner

*Primary Examiner*—Glenn A. Auve
(74) *Attorney, Agent, or Firm*—Milad G Shara

(57) ABSTRACT

The present invention provides a disk drive system employing a method of analyzing disk drive failure wherein a disk drive target controller is logically connected to an initiator on a SCSI bus. The method includes storing SCSI bus state information upon the receipt of a SCSI bus reset condition. SCSI bus state information is maintained, wherein the SCSI bus state information corresponds to the logical connection between the initiator and the disk drive target controller on the SCSI bus. A SCSI bus reset condition is detected. The maintained SCSI bus state information is stored upon detection of the SCSI bus reset condition. Actions are preformed to reset devices connected to the SCSI bus, including resetting the disk drive target controller. The SCSI bus state information can be subsequently analyzed to aid in determining the cause of the SCSI bus reset condition.

21 Claims, 4 Drawing Sheets

DISK DRIVE METHOD OF DETERMINING SCSI BUS STATE INFORMATION AFTER A SCSI BUS RESET CONDITION

BACKGROUND OF THE INVENTION

1. Field of the Invention

The present invention relates to a method of analyzing disk drive failure wherein a disk drive target controller is connected to an initiator on a SCSI bus, including storing SCSI bus state information upon receipt of a SCSI bus reset condition.

2. Description of the Prior Art

In the disk drive industry, the small computer system interface (SCSI) is an industry standard which uses a bus protocol and hardware interface to allow multiple devices to communication across the same bus. In one example, from 2–16 devices can be connected to the SCSI bus. A SCSI device can either be an initiator or a target. For example, a host initiator sends commands, and a disk drive target controller responds. Although most any combination of initiators and targets can be connected to the SCSI bus, only one initiator and one target can be communicating on the SCSI bus at a given moment.

The SCSI bus is designed to operate within multiple logical phases. The SCSI bus can only be in one phase at any given time. Transitions between logical phases is accomplished in a pre-defined manner. Examples of the phases of the SCSI bus are BUS-FREE, ARBITRATION, SELECTION, RESELECTION, COMMAND, DATA IN, DATA OUT, STATUS, MESSAGE IN AND MESSAGE OUT. The BUS-FREE phase occurs when none of the devices are active on the SCSI bus. The ARBITRATION phase is used wherein multiple devices are attempting to get on the SCSI bus. Each device has a distinctive SCSI ID wherein the device having the highest SCSI ID (i.e., having the predetermined highest priority) is allowed to get on the bus. The SELECTION phase allows a host initiator to connect to a disk drive target, and the RESELECTION phase allows the target to reconnect to the initiator. By doing so, the target can continue an operation previously started by the initiator, but suspended by the drive. The command, data, status and message logical phases are called the information transfer phases.

Bus transactions allowing the exchange of information take place on the SCSI bus using a defined request/acknowledge (REQ/ACK) hand-shake protocol. Transfers across the SCSI bus can be synchronous or asynchronous. In asynchronous data transfer, there is an interlocked request and acknowledge control line hand-shake for each unit of data to ensure that the data are sent accurately. Non-data transfers (e.g., commands, status responses, etc.) use asynchronous mode.

Synchronous data transfer allows data to be transferred at a faster rate than asynchronous data transfer. In a synchronous data transfer, data is sent at a preset or negotiated data rate, such as 5 mega-transfers per second. In particular, a negotiated SCSI period and a negotiated SCSI offset is determined between the initiator and the target. The negotiated SCSI period is defined as the negotiated rate at which requests and acknowledgments are sent (e.g., 5 mega-transfers/sec). The negotiated or "maximum" SCSI offset is defined as the maximum number of requests outstanding before the target will stop and wait for an acknowledgment to occur.

The SCSI controller keeps track of information relevant to its present communication status. For example, the SCSI controller may track the SCSI ID of the initiator device which it is actively communicating with via the SCSI bus, a SCSI offset counter (which counts the number of SCSI requests which have not been acknowledged), the negotiated SCSI period, the negotiated SCSI offset, and the SCSI bus phase. When the target disk drive controller is active on the SCSI bus, this information is utilized for communicating with the initiator.

A reset condition detected on the SCSI bus aborts any active phase. A reset is always followed by the bus free phase. A reset condition may be caused by a communication error associated with the initiator, the disk drive target, or less typically, a device which is connected to the SCSI bus but which is not active on the SCSI bus.

In one example, a reset condition may occur during a synchronous data transfer wherein the SCSI offset counter exceeds the negotiated SCSI offset. In another example regarding a 512 byte transfer, the initiator will expect to see 512 request pulses occur. In particular, the disk drive target may have generated 512 request pulses, but the initiator only counted 511, so the initiator only responds with 511 acknowledges. The disk drive target is expecting 512 acknowledges, since each request must be paired with an acknowledge. Therefore, the host initiator will wait a predetermined time delay to receive the last request. After the time delay, the host initiator will generate a reset.

A reset condition generated on the SCSI bus will reset all devices, both active an inactive, connected to the SCSI bus. The reset operates to clear registers containing SCSI bus state or status information associated with each device at the time of the reset, or operates to return the information contained within these registers to a default state. It is difficult to later determine the cause of the reset condition, since the SCSI bus state information at the time of the reset is no longer available.

Further, multiple devices are connected to the common SCSI bus. Although only one initiator and one disk drive target are active on the SCSI bus at any given moment, the reset condition operates to clear the registers of devices which are not active on the SCSI bus but connected to the SCSI bus at the time of the reset. Since the state registers of both active and inactive devices have been cleared or reset to a default state, it is difficult to determine which device was active on the SCSI bus at the time of the reset, and therefore, may have caused the reset to occur.

SUMMARY OF THE INVENTION

The present invention provides a method of analyzing disk drive failure wherein a disk drive target controller is logically connected to an initiator on a SCSI bus, including storing the SCSI bus state information upon receipt of a SCSI bus reset condition.

In one embodiment, the method includes the step of maintaining SCSI bus state information corresponding to the logical connection between the initiator and the disk drive target controller on the SCSI bus. A SCSI bus reset condition is detected. The maintained SCSI bus state information is stored upon detection of the SCSI bus reset condition. Actions are performed to reset devices connected to the SCSI bus, including resetting the disk drive target controller. The SCSI bus state information can be subsequently analyzed for determining the cause of the SCSI bus reset condition.

The step of storing the maintained SCSI bus state information may include the step of storing the maintained SCSI bus state information in a set of registers in the disk drive target controller. The step of storing the maintained SCSI bus state information may include the step of transferring the SCSI bus state information stored in the set of registers to non-volatile memory. In one aspect, the non-volatile memory is a disk surface associated with the target disk drive controller.

In one aspect, the method further includes the step of retrieving the SCSI bus state information. The SCSI bus state information is used to aid in determining the cause of the SCSI bus reset condition.

The step of maintaining the SCSI bus state information may include the step of storing an initiator identification corresponding to the initiator in memory. In another aspect, the SCSI bus has an active bus phase, wherein the step of maintaining the SCSI bus state information includes the step of storing a bus phase identification corresponding to the active bus phase in memory. In one aspect, the logical connection between the initiator and the disk drive target controller includes an asynchronous transfer of information. In another aspect, the logical connection between the initiator and the disk drive target controller includes a synchronous transfer of information. The logical connection includes a request and acknowledge hand-shake protocol, wherein each acknowledge is paired with each request. The method further includes the steps of defining a SCSI bus offset count, wherein the SCSI bus offset count is equal to the number of requests which have not been acknowledged, and wherein the step of maintaining the SCSI bus state information includes the step of storing the SCSI bus offset count in memory.

The step of maintaining SCSI bus state information may further include the step of storing a status which indicates whether the initiator provided an initiator SCSI identification to the disk drive target controller. The step of maintaining SCSI bus state information may further include the step of storing an active device identification which corresponds to a SCSI identification of the initiator which is in communication with the disk drive target controller. The step of maintaining SCSI bus state information may include the step of storing SCSI bus state information in a register. The step of storing the maintained SCSI bus state information upon detection of SCSI bus reset may include the step of latching the register.

In another embodiment, the present invention is a disk drive system having a system for analyzing disk drive error. The disk drive system includes a disk drive target controller logically connected to an initiator on a SCSI bus. The disk drive system includes means for maintaining SCSI bus state information corresponding to the logical connection between the initiator and the disk drive target controller on the SCSI bus. Means are provided for detecting a SCSI bus reset condition. Means are provided for storing the maintained SCSI bus state information upon detection of the SCSI reset condition. Means are provided for performing actions to reset devices connected to the SCSI bus, including resetting the disk drive target controller. The SCSI bus state information can be subsequently analyzed for determining the cause of the SCSI bus reset condition.

In one aspect, means are provided for retrieving the SCSI bus state information. In one aspect, the means for maintaining the SCSI bus state information includes a register located in the disk drive target controller, and further includes means for storing the maintained SCSI bus state information in the register.

The means for maintaining may include an initiator identification stored in memory, wherein the initiator identification corresponds to identify the initiator in communication with the disk drive target controller. The SCSI bus has an active bus phase, wherein the means for maintaining may include a bus phase identification stored in memory wherein the bus phase identification corresponds to the active bus phase. The SCSI bus includes a request and acknowledge handshake protocol, wherein the disk drive target controller includes a SCSI bus offset counter having a counter value. The counter value is equal to the number of requests which have not been acknowledged. The counter value is stored in memory. The means for maintaining may also include an active device identification stored in memory. The active device identification corresponds to whether the disk drive controller is in active communication on the SCSI bus.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Within the drawings, like numbers designate like elements.

DETAILED DESCRIPTION

The present invention provides for a method of analyzing disk drive failure wherein a disk drive target controller is logically connected to an initiator on a SCSI bus, including storing SCSI bus state information upon the detection of a SCSI reset condition. The stored SCSI bus state information can be subsequently analyzed for determining the cause of the SCSI reset condition.

Figure 1:
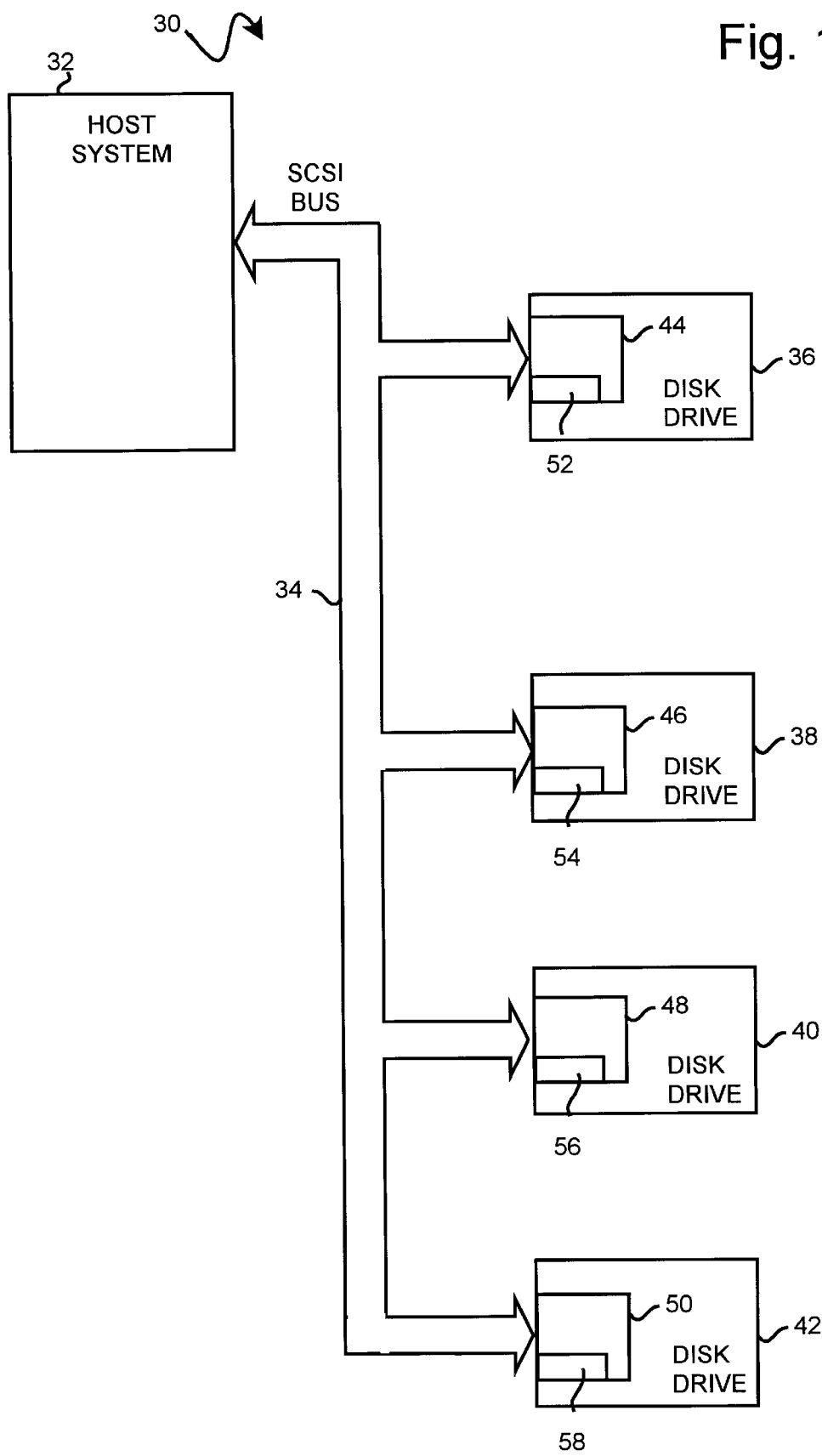
FIG. 1 is a block diagram illustrating one exemplary embodiment of a hard disk drive system having a SCSI bus interface in accordance with the present invention.

A hard disk drive system employing a SCSI bus interface according to the present invention is illustrated generally at 30 in FIG. 1. SCSI disk drive system 30 employs a method for analyzing disk drive failure including storing SCSI bus state information upon the receipt of a SCSI reset condition.

SCSI disk drive system 30 includes multiple devices (hard disk drives) and a host logically connected to a common SCSI bus. In particular, SCSI disk drive system 30 includes a host system 32, a SCSI bus 34, and a disk drive target 36, a disk drive target 38, a disk drive target 40, and disk drive target 42. Host system 32, disk drive targets 36, 38, 40, and 42 are each connected to the SCSI bus 34, and accordingly, communicate with each other via the SCSI bus 34. It is recognized that other devices or peripherals may also be connected to the SCSI bus 34. Host system 32 can include a microprocessor based data processing system such as a personal computer, or other system capable of performing a sequence of logical operations. Data is transmitted between the host system 32 and disk drive targets 36, 38, 40, 42 via the SCSI bus 34. SCSI bus 34 is defined as an industry standard SCSI bus for connecting multiple devices to a common bus (e.g., SCSI-1, SCSI-2, or SCSI-3). In one exemplary embodiment, SCSI bus 34 uses a SCSI-3 bus protocol and hardware interface to allow host system 32 and disk drive targets 36, 38, 40, and 42 to communicate across the same bus, as known to those skilled in the art. The entire contents of the SCSI-3 bus standard specification is incorporated herein by reference.

Each disk drive target 36, 38, 40, 42 include a SCSI or "host interface" controller 44, 46, 48, 50. Each SCSI controller 44, 46, 48, 50 is connected to SCSI bus 34 allowing host system 32 to communicate with corresponding disk drive targets 36, 38, 40, 42. Each SCSI controller 44, 46, 48, 50 includes a memory location or register 52, 54, 56, 58 which maintains active SCSI bus state information for the corresponding SCSI controller 44, 46, 48, 50. As will be described in detail herein, upon detection of a SCSI bus reset condition, the active SCSI bus state information contained within each register 52, 54, 56, 58 is stored in memory. Accordingly, the SCSI bus state information can be analyzed at a later time to aid in determining the cause of the SCSI bus reset condition.

Figure 2:
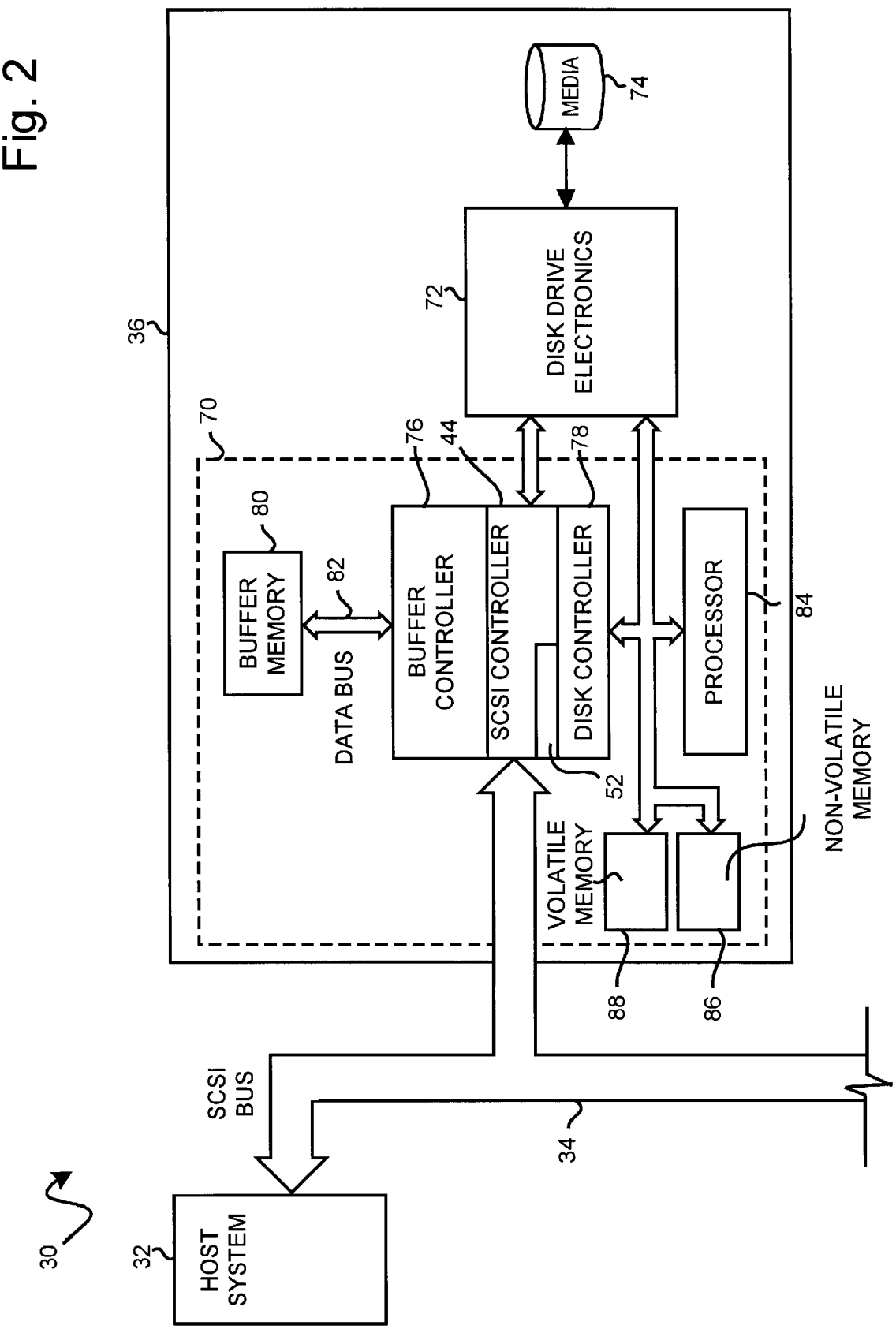
FIG. 2 is a block diagram illustrating one exemplary embodiment of a host initiator and disk drive target in accordance with the present invention.

In FIG. 2, a block diagram illustrating one preferred embodiment of target disk drive 36 is shown. Although only target disk drive 36 is described in detail, disk drives 38, 40, 42, are similar to disk drive 36 as detailed herein.

Disk drive 36 includes an interface disk control system 70, disk drive electronics 72, and media 74. Interface disk control system 70 and disk drive electronics 72 provide an intelligent disk control system interface and disk drive electronics for execution of read and write commands at media 74. Media 74 comprises one or more disk surfaces as known to those skilled in the art.

Interface disk control system 70 includes SCSI controller 44, a buffer controller 76 and a disk controller 78. SCSI controller 44 communicates with host system 32 via SCSI bus 34 by receiving commands and data from and transmitting status and data back to host system 32. Buffer controller 76 controls a buffer memory 80 employed for storing data via data bus 82 from host system 32 which is to be written to media 74. In addition, buffer controller 76 controls buffer memory 80 for storing data read from media 74. Buffer memory 80 typically comprises volatile memory, such as dynamic random access memory (DRAM). Disk controller 78 sends data to and receives data from a read/write channel located in the disk drive electronics 72, as know to those skilled in the art. Disk controller 78 also provides for error correction and error detection on data read from media 74.

An interface processor 84 handles the flow of data commands received by SCSI controller 44 by sending commands to and reading status from disk controller 78. Interface processor 84 ascertains which commands to process from host system 32 and when to process these commands, and directs other tasks performed by disk controller 78. Disk drive control system operational programs are stored in non-volatile memory 86, which may be read-only memory (ROM) or flash memory. Alternatively, system operational programs maybe stored on media 74. Upon start-up of disk drive 36, disk drive programs, such as the servo operational programs, are transferred into volatile memory 64 for fast access by the disk drive electronics 72 for execution of read and write commands.

SCSI controller 44 operates as a host interface with host system 32 via SCSI bus 34. SCSI controller 44 maintains SCSI bus state information within register 52. Upon detection of a SCSI bus reset condition, the SCSI bus state information maintained in register 52 is latched and stored in one or more memory locations. In one preferred embodiment, the SCSI bus state information is latched, read by interface processor 84, and written to a data record in the reserved area on a disk surface contained within media 74.

One suitable SCSI controller for use as SCSI controller 44 is a SYM 201 F40 integrated 8 SCSI controller commercially available from Symbios Logic, Inc. The integrated SCSI controller includes a SCSI protocol controller, host (SCSI) DMA engine, command queuing engine (CQE), buffer manager, disk formatter, data ECC, and microprocessor interface for interfacing between a hard disk drive and a SCSI bus.

Figure 3:
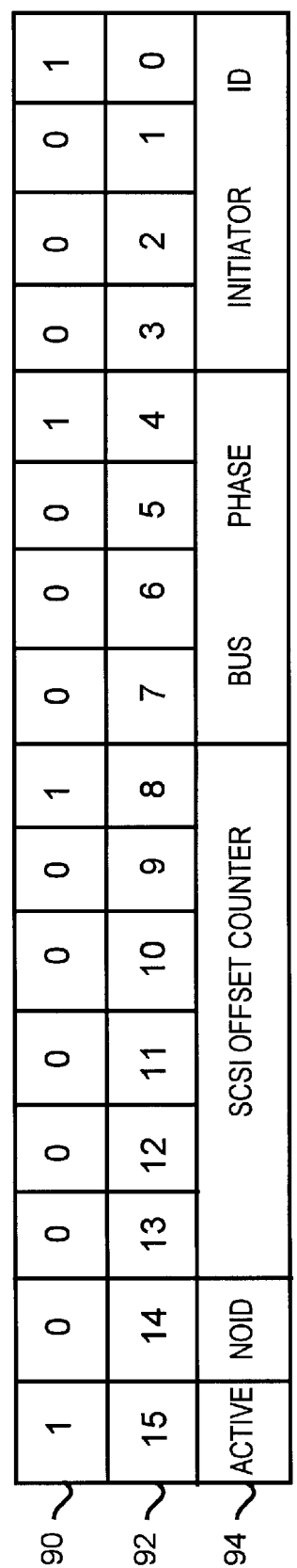
FIG. 3 is a diagram illustrating one exemplary embodiment of maintained SCSI bus state information stored in memory, in accordance with the present invention.

FIG. 3 illustrates one exemplary embodiment of active SCSI bus state information maintained in register 52. It is recognized that it will be apparent to those skilled in the art after reading the present application that it would be beneficial to store other SCSI bus state information than is detailed in the example herein. In the exemplary embodiment shown, register 52 is a 16-bit register. An example register state after a SCSI bus reset condition has been detected is indicated at 90. Further, for the purpose of explanation, a corresponding bit number is indicated at 92, and description is indicated at 94.

In the exemplary embodiment shown, bits 0–3 represent the active initiator identification (ID) when the SCSI bus reset was detected (i.e., the SCSI ID of the initiator which is communicating with the disk drive target controller). Bits 4–7 are representative of the active bus phase at the moment the SCSI bus reset was detected. In one exemplary embodiment, the SCSI bus phase is defined by these bits as indicated in the following table:

| Bit | | | | |
|---|---|---|---|---|
| 3 | 2 | 1 | 0 | Bus Phase |
| 0 | 0 | 0 | 0 | Bus Free |
| 0 | 0 | 0 | 1 | Data Out |
| 0 | 0 | 1 | 1 | Date In |
| 0 | 1 | 0 | 1 | Command |
| 0 | 1 | 1 | 1 | Status |
| 1 | 0 | 0 | 0 | SCAM Selection |
| 1 | 0 | 0 | 1 | Reserved |
| 1 | 0 | 1 | 1 | Reserved |
| 1 | 1 | 0 | 1 | Message Out |
| 1 | 1 | 1 | 1 | Message In |

Bits 8–13 represent the value of the SCSI offset counter at the moment a SCSI bus reset was detected. For a synchronous data transfer, the value of the SCSI offset counter is equal to the number of requests (REQ) sent minus the number of acknowledges (ACK) received. Bit 14 (NOID) is set if the SCSI bus reset occurred with no initiator ID provided to the disk drive target controller. Bit 15 (ACTIVE) is set if the disk drive target controller is active on the SCSI bus at the moment the SCSI bus reset was detected. Since a SCSI bus reset will reset the SCSI controller of every device connected to the SCSI bus, bit 15 indicates which device was active on the SCSI bus, and therefore, may have caused the reset to occur.

After a reset condition is detected, the SCSI status information contained in register 52 is latched, can be read by interface processor 84 and subsequently written to media 74. By analyzing the logged SCSI bus state information, an operator or control system is aware that disk drive 36 was active on the SCSI bus 34 at the moment the SCSI bus reset was detected. Further, since the SCSI offset counter is non-zero, it may indicate that there was an acknowledge lost which caused the host initiator 32 SCSI device to time-out and issue a SCSI bus reset. Alternatively, it will be apparent to those skilled in the art that the latched SCSI bus state information may be used for other purposes.

Figure 4:
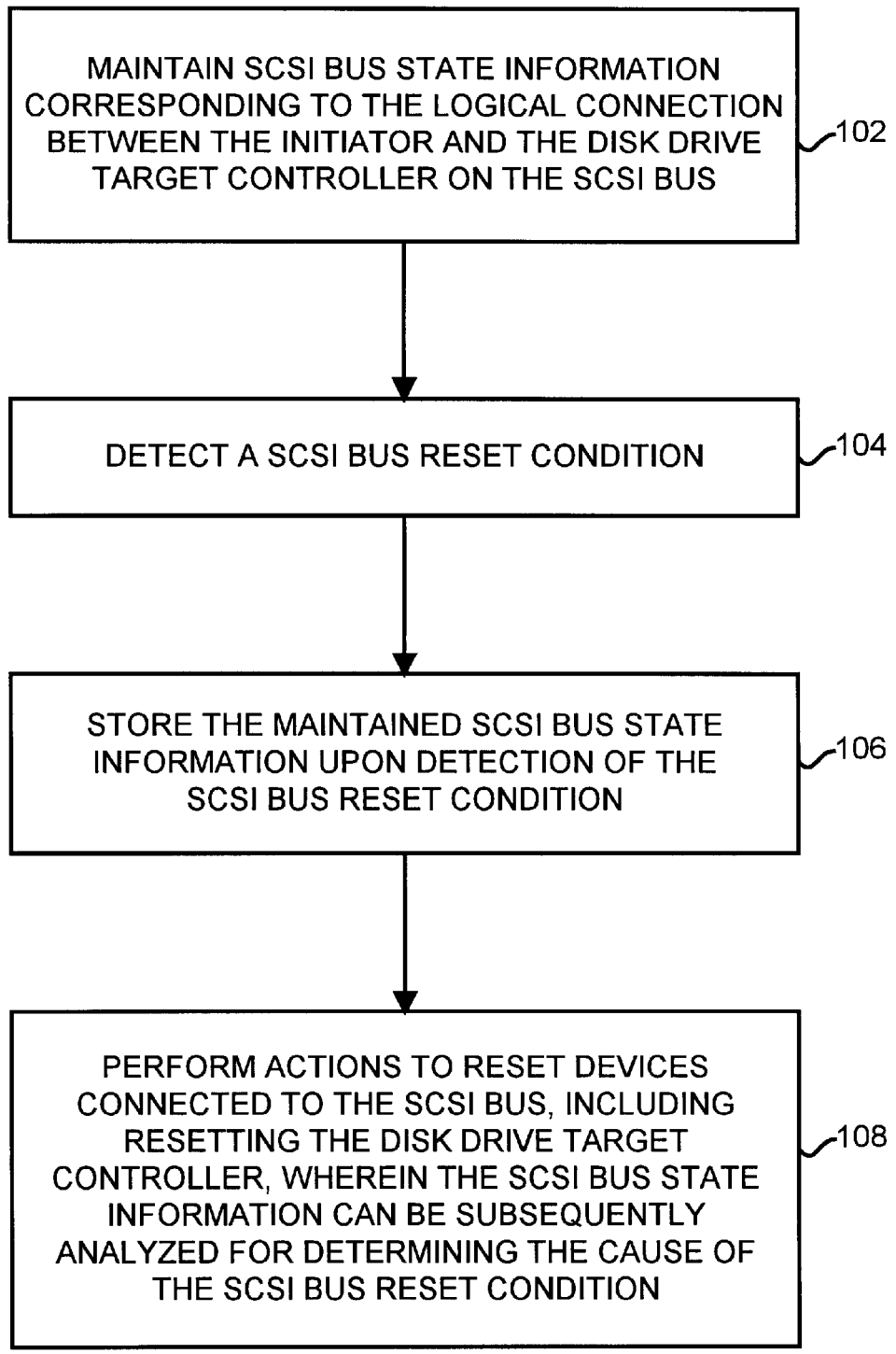
FIG. 4 is a flow chart illustrating one exemplary embodiment of a method of analyzing disk drive failure wherein a disk drive target controller is logically connected to an initiator on a SCSI bus, including storing SCSI bus state information upon receipt of a SCSI reset condition, in accordance with the present invention.

FIG. 4 is a flow chart illustrating one exemplary embodiment of a method of analyzing disk drive failure wherein a disk drive target controller is logically connected to an initiator on a SCSI bus, including storing SCSI bus state information upon the receipt of a SCSI bus reset condition, in accordance with the present invention. Reference is also made to FIGS. 1–3. In this example, host system 32 and disk drive 36 are active on the SCSI bus 34. Host system 32 is active as the initiator on the SCSI bus, and disk drive 36 is active as the target on the SCSI bus 34.

In step 102, SCSI bus state information is maintained corresponding to the logical connection between the initiator and the disk drive target controller on the SCSI bus. The SCSI bus state information is information which relates to the active status of the SCSI bus, and in particular, at the moment a SCSI bus reset condition is detected. In the exemplary embodiment shown, the SCSI bus state information is maintained in a register 52 in SCSI controller 44. The SCSI bus state information includes storing a status which indicates whether the initiator provided an initiator SCSI identification to the disk drive target controller. A bus phase identification is stored in the register 52, corresponding to the active SCSI bus phase. The active or present value of the SCSI bus offset count is stored in register 52, where the SCSI bus offset count is equal to the number of requests which have not been acknowledged. An initiator identification is stored in register 52 which indicates the initiator host system 32 is in communication with the disk drive target controller on the SCSI bus 34. Further, the SCSI bus state information includes an active device identification which corresponds to whether the disk drive target controller 44 is active on the SCSI bus 34.

In step 104, a SCSI bus reset condition is detected. In step 106, the maintained SCSI bus state information is stored upon detection of the SCSI bus reset condition. In the exemplary embodiment shown, the SCSI bus state information stored in register 52 is latched when the SCSI bus reset condition is detected, read by interface processor 84 and written to a reserved area of a disk surface in media 74.

In step 108, actions are performed to reset devices connected to SCSI bus 34, including resetting the disk drive target controller 52. Typically, SCSI controllers 54, 56, 58 would also be reset. The maintained SCSI bus state information can be subsequently analyzed for determining the cause of the SCSI bus reset condition.

We claim:

1. A method of analyzing disk drive failure wherein a disk drive target controller is logically connected to an initiator on a SCSI bus, including storing SCSI bus state information upon the receipt of a SCSI bus reset condition, the method comprising the steps of:

maintaining SCSI bus state information corresponding to the logical connection between the initiator and the disk drive target controller on the SCSI bus;

detecting a SCSI bus reset condition;

storing the maintained SCSI bus state information upon detection of the SCSI bus reset condition; and performing actions to reset devices connected to the SCSI bus, including resetting the disk drive target controller, wherein the SCSI bus state information can be subsequently analyzed for determining the cause of the SCSI bus reset condition.

2. The method of claim 1, wherein the step of storing the maintained SCSI bus state information includes the step of storing the maintained SCSI bus state information in a set of registers in the disk drive target controller.

3. The method of claim 2, wherein the step of storing the maintained SCSI bus state information further includes the step of transferring the SCSI bus state information stored in the set of registers to non-volatile memory.

4. The method of claim 3, wherein the non-volatile memory is a disk surface associated with the disk drive target controller.

5. The method of claim 1, further comprising the step of retrieving the SCSI bus state information.

6. The method of claim 5, further comprising the step of using the SCSI bus state information to aid in determining the cause of the SCSI bus reset condition.

7. The method of claim 1, wherein the step of maintaining SCSI bus state information includes the step of storing an initiator identification corresponding to the initiator in memory.

8. The method of claim 1, wherein the SCSI bus has an active bus phase, the step of maintaining SCSI bus state information includes the step of storing a bus phase identification corresponding to the active bus phase in memory.

9. The method of claim 1, wherein the logical connection between the initiator and the disk drive target controller includes an asynchronous transfer of information.

10. The method of claim 1, wherein the logical connection between the initiator and the disk drive target controller includes a synchronous transfer of information.

11. The method of claim 10, wherein the logical connection includes a request and acknowledge hand-shake protocol, wherein each acknowledge is paired with each request, further comprising the steps of defining a SCSI bus offset count, wherein the SCSI bus offset count is equal to the number of requests which have not been acknowledged; and wherein the step of maintaining SCSI bus state information includes the step of storing the SCSI bus offset count in memory.

12. The method of claim 1, wherein the step of maintaining SCSI bus state information further includes the step of storing a status which indicates whether the initiator provided an initiator SCSI identification to the disk drive target controller.

13. The method of claim 1, wherein the step of maintaining SCSI bus state information further includes the step of storing an active device identification which corresponds to an initiator SCSI identification of the initiator which is in communication with the disk drive target controller.

14. The method of claim 1, wherein the step of maintaining SCSI bus state information includes the step of storing SCSI bus state information in a register; and the step of storing the maintained SCSI bus state information upon detection of a SCSI bus reset condition includes the step of latching the register.

15. A disk drive system having a system for analyzing disk drive error, the disk drive system including a disk drive target controller logically connected to an initiator on a SCSI bus, the disk drive system comprising:

means for maintaining SCSI bus state information corresponding to the logical connection between the initiator and the disk drive target controller on the SCSI bus;

means for detecting a SCSI bus reset condition;

means for storing the maintained SCSI bus state information upon detection of the SCSI bus reset condition; and means for performing actions to reset devices connected to the SCSI bus, including resetting the disk drive target controller, wherein the SCSI bus state information can be subsequently analyzed for determining the cause of the SCSI bus reset condition.

16. The disk drive system of claim 15, further comprising means for retrieving the SCSI bus state information.

17. The disk drive of claim 15, wherein the means for storing the maintained SCSI bus state information includes a set of registers located in the disk drive target controller; and further comprises means for storing the maintained SCSI bus state information in the set of registers.

18. The disk drive of claim 15, wherein the means for maintaining includes an initiator identification stored in memory, wherein the initiator identification corresponds to the initiator in communication with the disk drive target controller.

19. The disk drive of claim 15, wherein the SCSI bus has an active bus phase, and wherein the means for maintaining includes a bus phase identification stored in memory corresponding to the active bus phase.

20. The disk drive of claim 15, wherein the SCSI bus includes a request and acknowledge handshake protocol, and wherein the disk drive target controller includes a SCSI bus offset counter having a counter value, wherein the counter value is equal to the number of requests which have not been acknowledged, and wherein the counter value is stored in memory.

21. The disk drive of claim 15, wherein the means for maintaining includes an active device identification stored in memory, wherein the active device identification corresponds to whether the disk drive controller is in active communication on the SCSI bus.

* * * * *